Figure 1:
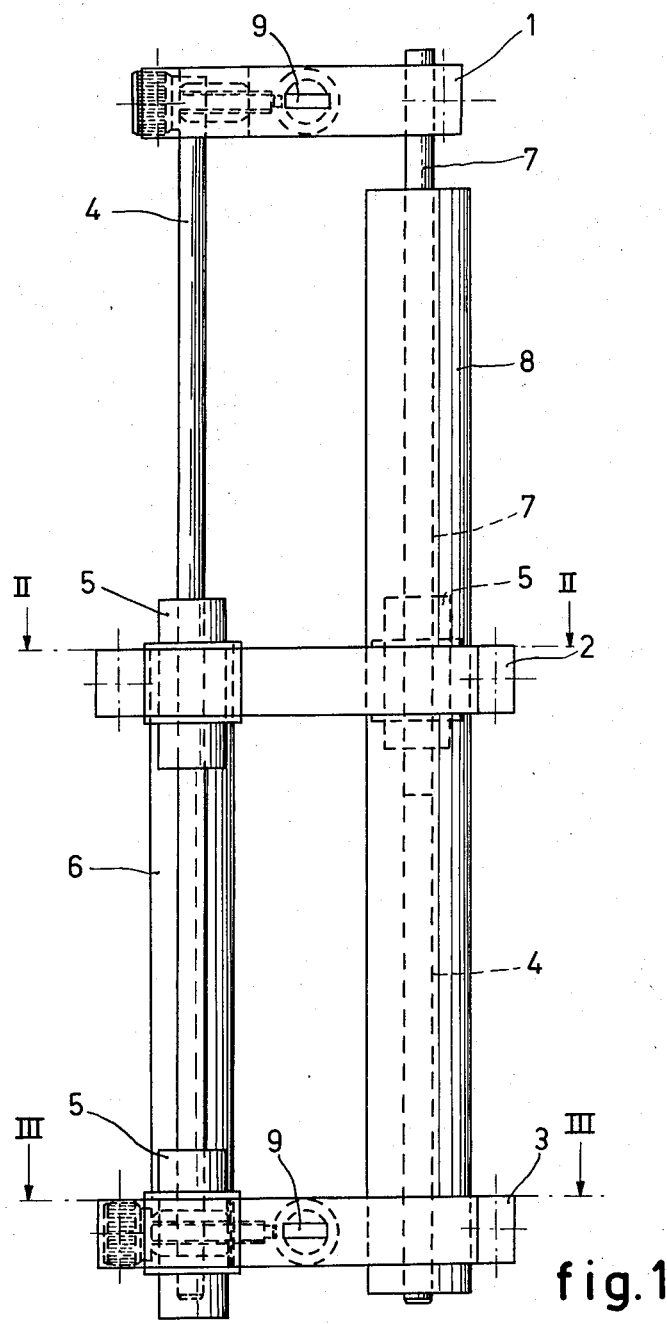

United States Patent
von Marinelli et al.

[15] 3,696,512
[45] Oct. 10, 1972

[54] EXTENSOMETER

[72] Inventors: Silvio M. N. K. W. F. von Marinelli; Jules Herman Vree; Joannes B. Verboom, all of Emmasingel, Eindhoven, Netherlands

[73] Assignee: U.S. Philips Corporation, New York, N.Y.

[22] Filed: March 3, 1970

[21] Appl. No.: 16,198

[30] Foreign Application Priority Data

March 6, 1969 Netherlands..............6903437

[52] U.S. Cl. ..............................33/147 D, 33/148 D
[51] Int. Cl. ..............................................G01b 5/00
[58] Field of Search.........................33/147 D, 148 D

[56] References Cited
UNITED STATES PATENTS 3,295,365  1/1967  Larrigan..................33/147 D
3,151,399  10/1964  MacGeorge.............33/147 D

*Primary Examiner*—Leonard Forman
*Assistant Examiner*—Paul G. Foldes
*Attorney*—Frank R. Trifari

[57] ABSTRACT

An extensometer having a pair of platforms movable relative to each other by a guide pin and guide sleeve arrangement. The platforms are substantially U-shaped with the guide pins arranged on points diametrically opposed to each other. An inductive displacement recorder comprising a ferromagnetic core secured to one of the platforms and a coil system secured to the other platform is arranged for telescoping movement with respect to each other. A clamp is mounted on each of the platforms and arranged for securement to a sample to be tensile tested so that the extensometer, which forms a cage construction, is concentrically secured to the sample to be tested.

4 Claims, 8 Drawing Figures

EXTENSOMETER

The invention relates to an extensometer comprising an inductive displacement recorder having a coil system and a ferro-magnetic core which are linearly movable relative to each other. The core is clamped to one side of a sample to be tested and the coil system is clamped to the other.

For the determination of mechanical properties of materials, the tensile test is the most simple and most frequently used. In the tensile test the material is elongated and the occurring elongation with the associated load is measured and recorded in a diagram, the tensile curve. Most tensile test apparatus have a device for recording a tensile curve. The recorded elongation as a rule includes the displacement of the chucks holding the sample relative to each other. As a result, the elongation of parts other than sample, for example, play of the chucks, is recorded in addition to the increase in length of said sample. The necessity of performing the tensile test more accurately has resulted in the elongation being measured directly on the test sample by means of extensometers to be clamped on the sample. The increase in length is recorded by means of an inductive displacement recorder. The operation of this recorder is based on a variation of the inductivity of two coils as a result of a displacement of a ferro-magnetic core.

Such known extensometers, however, are suitable only for a fixed length to be measured. In most cases an angular displacement occurs in the measuring system which permits only a restricted increase in length. As a result, the displacement to be followed is restricted to a maximum value. The total tensile curve of a given sample is therefore frequently not fully recorded.

It is the object of the invention to provide an extensometer of the type described which is universal of application for testing materials of different types and which provides the ability of continuously adjusting variable measuring lengths for various sample dimensions and, independently of said adjusted measuring lengths, following the variations in length during the test up to breakage of the sample with constant accuracy without a bending stress occurring in the material to be tested by an eccentric distribution of weight and without damage to the sample. For that purpose, according to the invention, a first and a second platform is each provided with one of the two clamps, the core being secured to the first platform and the system of coils being connected to the second platform. The platforms, in cooperation with guide pins and guide sleeves, form a cage which can telescope in the axial direction. By means of the two platforms the clamps are coupled to the displacement recorder in such manner that the increase in length of the sample to be tested, without the intermediary of moving parts, is transferred from the clamps to the core and to the coil system. The cage formed by the platforms ensures a good alignment and prevents the tilting of the clamps on the sample.

Two guide pins are secured to the first platform and cooperate with at least two guide sleeves which are secured to with the second platform. As a result of this the alignment of the platforms, after breakage of the sample, is ensured and damage to the displacement recorder is prevented. Also as a result, the platform movement is maintained shock-free.

In an embodiment of the invention, the coil system and the guide sleeves are directly secured to the second platform, the coil system and the core being adjustable relative to the platforms. As a result of this a compact extensometer is obtained which is suitable for a series of continuously adjustable measuring lengths.

In another embodiment the guide sleeves are secured to an intermediate platform which is connected to the second platform by means of a supporting sleeve secured to the two platforms. The coil system can be clamped on the intermediate platform diametrically relative to the supporting sleeve. Because of the intermediate platform and the supporting sleeve it is possible to adjust the extensometer for measuring different lengths. The supporting sleeve also serves as a balance weight so that in the case of large measuring lengths the cage is statically balanced.

The platforms preferably have a more or less U-shaped rectangular profile, the guide pins and the guide sleeves being secured in apertures in the platforms situated diametrically opposite to each other. The core and the coil system is clamped near the end of one of the side arms of the platforms. As a result of this shape of the platforms and the suitable arrangement of the parts to be provided it is possible to clamp the extensometer concentrically relative to the sample to be tested.

In order to cause the axis of gravity of the cage to accurately align with the center line of the sample to be tested, each clamp consists of an adjustable knife edge and a resilient pressure support which are arranged opposite to each other on the side arms of the first and the second platform, the central arm of each platform comprising an adjustable abutment.

Since a third guide pin and a third guide sleeve cooperating with said pin are secured to the platforms and are arranged diametrically relative to the displacement recorder, the rigidity of the cage is ensured, particularly in the case of large measuring lengths.

Figure 2:
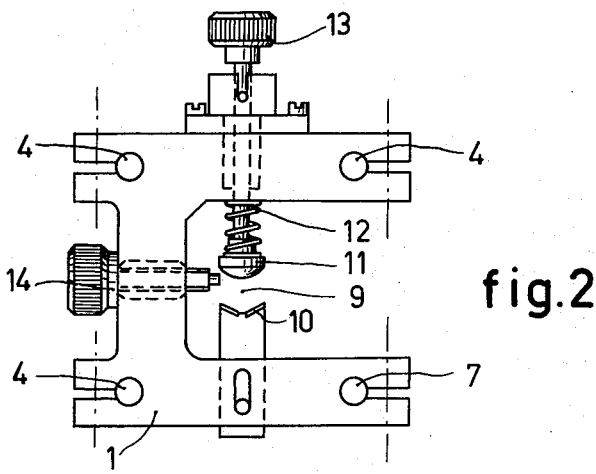
Figure 3:
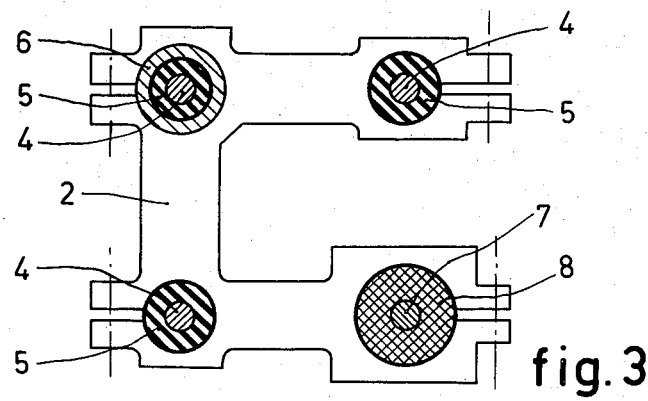

In order that the invention may be readily carried into effect, a few examples thereof will now be described in greater detail, by way of example, with reference to the accompanying drawings, in which FIG. 1 is a side elevation of an embodiment of the extensometer, FIG. 2 is a plan view of the upper platform, FIG. 3 is a plan view of the intermediate platform taken on the line II—II of FIG. 1.

Figure 4:
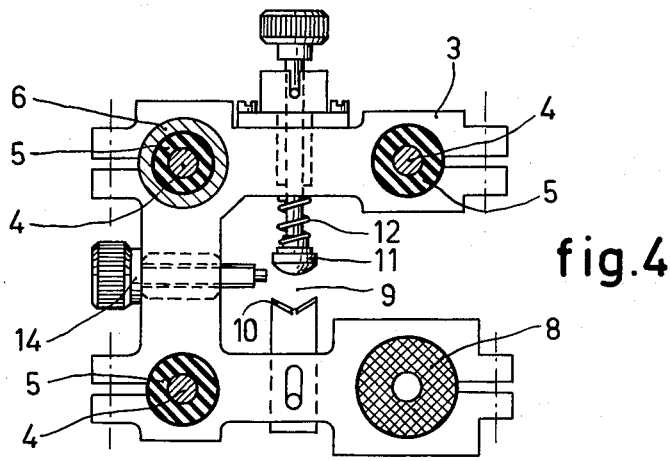
Figure 5:
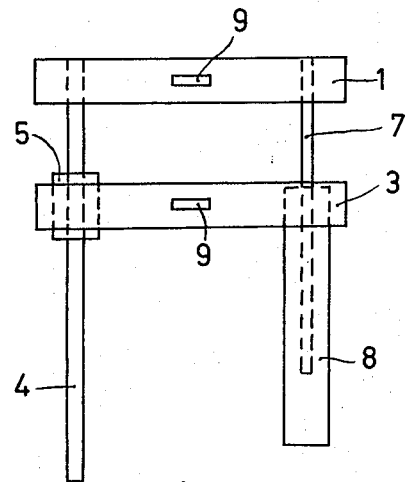
Figure 6:
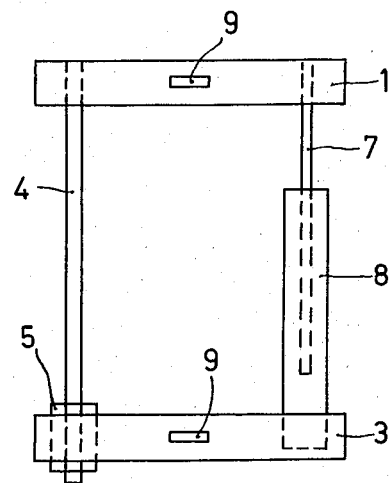
Figure 7:
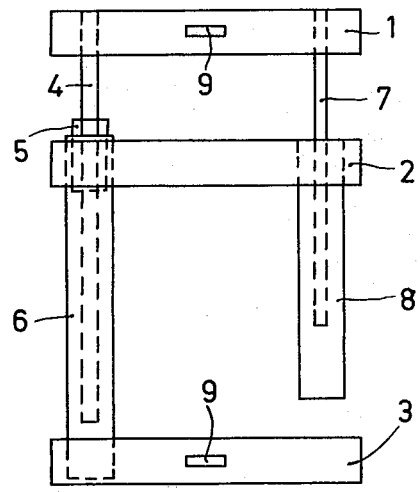
Figure 8:
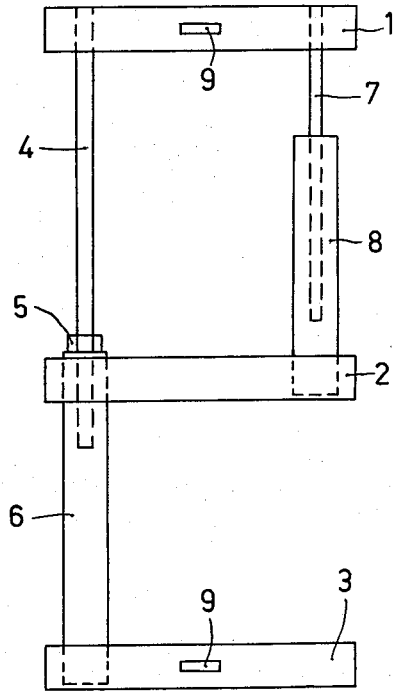

FIG. 4 is a plan view of the lower platform taken on the line III—III of FIG. 1, FIG. 5 is a diagrammatic representation of an extensometer having two platforms in the position for a minimum measuring length, FIG. 6 shows the extensometer having two platforms with another measuring length adjustment, FIGS. 7 and 8 show an extensometer having three platforms in different positions with different measuring length adjustments.

The extensometer shown in FIG. 1 comprises an upper platform 1, an intermediate platform 2, a lower platform 3, guide pins 4, guide sleeves 5, a supporting sleeve 6 and a displacement recorder consisting of a core 7 and a coil system 8. The platforms 1, 2 and 3 have a more or less rectangular profile and are provided with apertures for securing the displacement recorder and the guide elements. Two guide pins 4 are clamped at one end thereof in apertures, of the upper platform 1 situated diametrically opposite to each other and are axially movable relative to two guide sleeves 5 which are provided in apertures of the intermediate platform 2. The core 7 of the displacement recorder is clamped to the upper platform 1, while the coil system 8 is arranged in the elongation of the core 7 to the intermediate platform 2 and the lower platform 3. The intermediate platform 2 is coupled to the lower platform 3 by means of the supporting sleeve 6. The sleeve 6 is clamped to the intermediate platform 2 and the lower platform 3 at a position diametrically opposite to the displacement recorder. A third guide pin 4 is provided on the upper platform 1, the guide sleeve 5 cooperating therewith being secured within the supporting sleeve 6. Since a shock-free movement of the platform and a good alignment can already be obtained by means of two guide pins, the third guide pin is not always necessary. The supporting sleeve 6 and the coil system 8 are adjustable relative to the platforms to which they are secured so as to provide for measuring different length samples. A sufficient rigidity of the cage is obtained by means of the supporting sleeve 6, which also serves as a balance weight. The dimensions, the weight and the displacement of the supporting sleeve 6 relative to the displacement recorder are chosen to be so that the cage is statically balanced. The upper platform 1 and the lower platform 3 are each provided with a clamp 9 for clamping the extensometer on the sample to be tested. Each clamp 9 comprises an adjustable knife edge 10 and a pressure support 11 which are provided opposite to each other on the side arms of the platforms; the pressure support 11 is forced in the direction of the knife edge 10 by means of a spring 12 and can be set to a rest position manually by means of a knob 13 for clamping the sample to be tested. An adjustable abutment 14 is furthermore provided on the central arm of the upper platform 1 and the lower platform 3.

While a sample is being tested, the platforms 1 and 3 together with the guide pins 4, the guide sleeve 5, and the displacement recorder 7, 8 form a telescoping cage. The intermediate platform 2 is maintained at a constant distance from platform 3 by means of the supporting sleeve 6 during testing of the sample. By means of the clamps 9 the extensometer is clamped on the sample to be tested, which is stretched between the chucks of a drawing device. The cage is placed concentrically around the sample. It is collapsed to such an extent that the distance between the clamps 9 of the upper platform 1 and the lower platform 3 corresponds to the length to be measured of the sample to be tested. By accurate adjustments of the knife edge 10 and the abutment 14 it is achieved that the center line of the sample to be tested and the axis of gravity of the cage coincide.

The platforms are preferably manufactured from a light metal and the guide sleeves are preferably manufactured from a material having a low frictional resistance, for example, teflon, the guide pins being polished so that a shock-free displacement of the cage is obtained. One of the guide sleeves 5 is clamped to the intermediate platform 2, the other guide sleeves being provided with clearance so that they are self-adjustable relative to the guide pins 4 cooperating therewith. When the length of the guide pins 4 is sufficient, the guiding of the platforms relative to each other is also ensured after breakage of the sample to be tested; as a result of this, damage to the displacement recorder is prevented. In the example shown in FIG. 1 the coil system 8 is clamped to the lower platform 3 and the intermediate platform 2. However, when a displacement recorder is used having smaller dimensions for recording a smaller percentage of elongation to be expected, the coil system 8 of the displacement recorder is clamped only to the intermediate platform 2.

With the exception of the clamp 9, the lower platform 3 is identical to the intermediate platform 2. In testing samples having a smaller percentage of elongation a displacement recorder is used having a shorter length, the intermediate platform 2 being omitted and the guide pins 4 being replaced by shorter pins. FIGS. 5 and 6 show an embodiment of an extensometer having two platforms. The guide pins and the core of the displacement recorder are clamped to the upper platform, the guide sleeves and the coil system being provided on the lower platform.

The extensometer according to the invention is in the form of a construction kit system in which the three platforms form the basic elements which, in combination with displacement recorders, guide pins, and supporting sleeves of different dimensions, can be used for a large series of continuously adjustable measuring lengths and percentages of elongation.

The extensometer shown in FIG. 5 having two platforms is adjusted for a minimum measuring length, the coil system 8 being clamped to the lower platform 3 with the upper end. By displacing the coil system 8 relative to the lower platform 3, the extensometer is adjusted with the same components to larger measuring lengths. The largest measuring length to be obtained with the same coil system 8 is reached when the coil system 8 is clamped to the lower platform 3 with the lowermost end; this position of the extensometer is shown in FIG. 6. The series of adjustable measuring lengths can be extended, while maintaining the same displacement recorder, by means of the intermediate platform 2 which is connected to the lower platform 3 by the supporting sleeve 6. In this embodiment also the extensometer can be adjusted by displacing the coil system 8 relative to the intermediate platform 2, to obtain different measuring lengths between a minimum measuring length as shown in FIG. 7 and a maximum measuring length as shown in FIG. 8. In the embodiment having three platforms the supporting sleeve 6 can be adjusted in a similar manner relative to the intermediate platform 2 and the lower platform 3. By replacing the supporting sleeve by a sleeve having a larger length, the extensometer can be adapted to larger measuring lengths.

The means for clamping the guide elements, the supporting sleeve and the displacement recorder may be arbitrary and are not described further. For example, the guide pins and the core of the displacement recorder can be secured to the upper platform by means of clamping screws provided in the side wall of the upper platform. For clamping the coil system and the supporting sleeve, the intermediate platform and the lower platform are provided with slots which open into the corresponding apertures so that the walls of said apertures are flexibly deformable and are forced against the coil system and the supporting sleeve, respectively, by means of a screw connection. As a result of the small weight, the shock-free movement, and the good alignment of the extensometer, no disadvantageous influence is exerted on the sample to be tested so that the extensometer is suitable not only for testing test rods of a rigid material, but also for test strips of a flexible material.

The coil system is connected to a known intensifier and recorder by which the displacements to be measured are magnified and recorded.

What is claimed is

1. An extensometer comprising first and second platforms, an intermediate platform between said first and second platforms, each of said platforms have a substantially U-shaped rectangular profile, a supporting sleeve secured to said intermediate and said second platforms so as to connect said intermediate platform to said second platform, at least two guide pins secured to said first platform, at least two guide sleeves mounted in said intermediate platform, said guide pins and said guide sleeves being secured in apertures in the platforms which are situated diametrically opposite to each other thereby forming a cage construction, said guide pins and guide sleeves arranged for cooperation with each other so as to provide for movement of said first platform relative to said second platform so that said cage can telescope in an axial direction, an inductive displacement recorder comprising a ferromagnetic core secured to said first platform and a coil system connected to said intermediate platform, said coil system and said core being located near the respective end of one of the side arms of said platforms and being linearly movable relative to each other, said supporting sleeve being located at a position diametrically opposite said coil system so that said cage is statically balanced, and first and second clamps mounted on said first and second platforms for coupling said core and said coil system to a sample to be tested so that said cage construction is concentrically mounted about said sample.

2. The extensometer according to claim 1 wherein said first and second clamps each comprise adjustable knife edge mounted on said first and second platforms for engagement with the sample to be tested, a resilient pressure support arranged on a side arm of the first and second platforms opposite to the side arm on which said knife edge is arranged for urging said sample into pressure engagement with said knife edge, and an adjustable abutment mounted on the central arm of each of said platforms.

3. The extensometer according to claim 1 further comprising a third guide pin and a third guide sleeve cooperating with said guide pin, said guide pin and guide sleeves secured to said platforms and placed diametrically relative to said inductive displacement recorder.

4. The extensometer according to claim 1 wherein said coil system and said guide sleeves are directly secured to said second platform and wherein said coil system and said core are adjustable with respect to said platforms.

* * * * *